United States Patent [19]

Dangler

[11] Patent Number: 4,587,531
[45] Date of Patent: May 6, 1986

[54] CLOCK SIGNAL PRODUCING APPARATUS

[75] Inventor: Paul E. Dangler, Rochester, N.Y.

[73] Assignee: Eastman Kodak Company, Rochester, N.Y.

[21] Appl. No.: 668,124

[22] Filed: Nov. 5, 1984

[51] Int. Cl.⁴ .............................................. G01D 9/42
[52] U.S. Cl. .................... 346/108; 358/293
[58] Field of Search .................. 346/102 R, 108, 160; 358/293, 296

[56] References Cited

U.S. PATENT DOCUMENTS

| | | | |
|---|---|---|---|
| 3,848,087 | 11/1974 | Carrell | 346/108 |
| 3,993,957 | 11/1976 | Davenport | 328/38 |
| 4,103,251 | 7/1978 | Glick | 331/1 A |
| 4,134,073 | 1/1979 | MacGregor | 328/63 |
| 4,204,233 | 5/1980 | Swager | 346/108 |
| 4,316,148 | 2/1982 | Kaminski | 328/55 |
| 4,320,420 | 3/1982 | Rider | 358/293 |
| 4,400,740 | 8/1983 | Traino | 358/293 |

Primary Examiner—E. A. Goldberg
Assistant Examiner—Mark Reinhart
Attorney, Agent, or Firm—Raymond L. Owens

[57] ABSTRACT

Apparatus is disclosed for producing clock signals which are used to precisely control the modulation of a light beam by an acousto-optic modulator as it is line scanned by a moving mirror. The apparatus employs a set of spaced detectors which are located in the scanned beam path and respectively produce start-of-scan (SOS) and end-of-scan (EOS) signals. An oscillator which includes a delay line is responsive to the SOS and EOS signals to produce the clock signals. The delay line coupled to a NOR gate and flip-flop produces a delay line with the precise period $\tau$.

1 Claim, 1 Drawing Figure

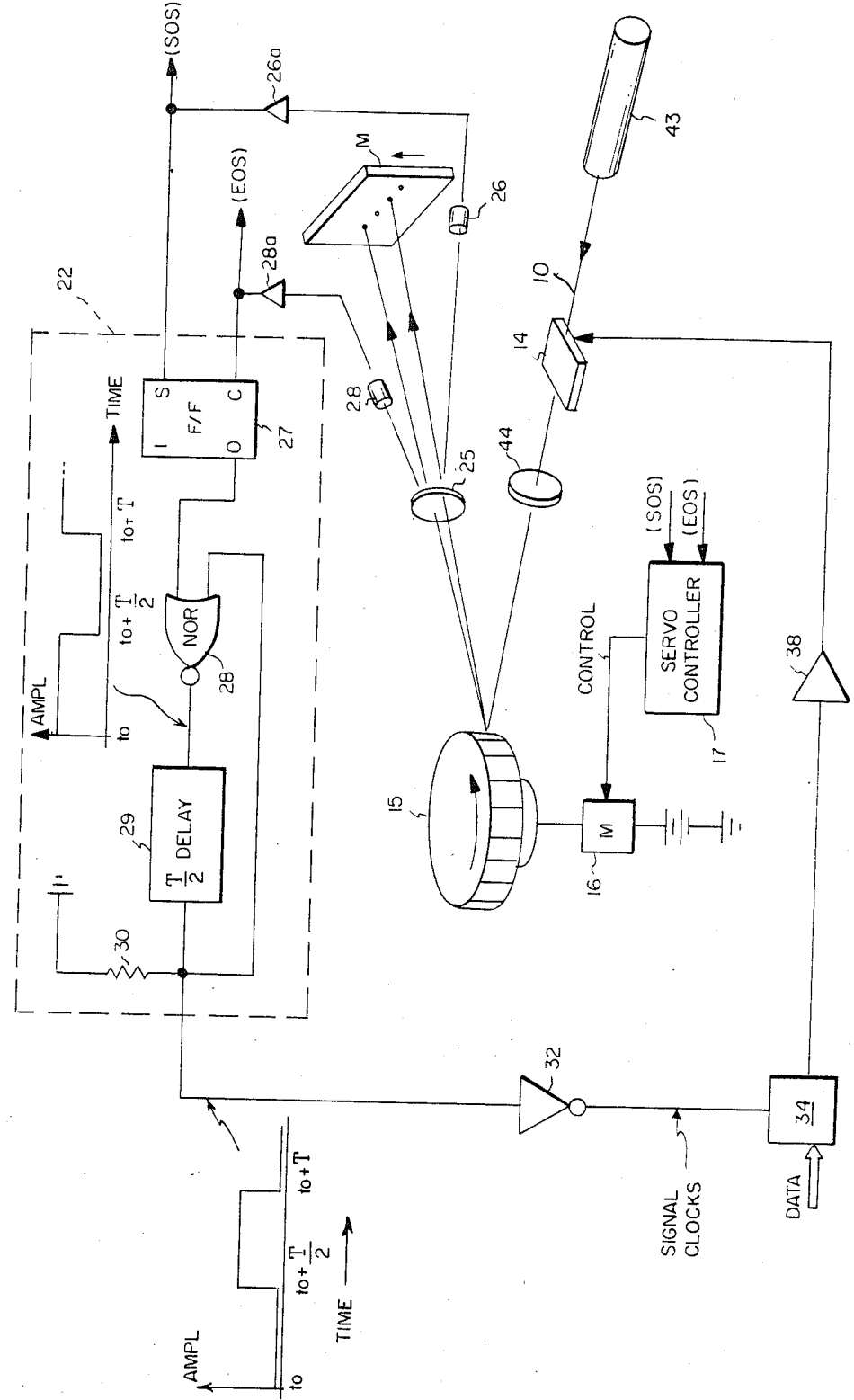

CLOCK SIGNAL PRODUCING APPARATUS

FIELD OF THE INVENTION

This invention relates to apparatus for precisely controlling the modulation of a laser beam as it is line scanned.

BACKGROUND OF THE INVENTION

Optical printing systems use output scanner systems wherein the intensity of a laser light beam focused on a moving two-dimensional photosensitive surface is modulated as the beam is line scanned relative to such moving surface to provide a two-dimensional output image. In one common output scanner system, a deflector, such as a rotating polygon mirror, line scans a beam of laser light. The intensity of such scanned light beam is modulated by an acoustooptic cell. Precise synchronization clock signals are necessary to represent the position of the laser beam as it is line scanned. The timing of the modulation of the laser beam is controlled by these clock signals. The clock signals control the flow of information from an electronic data buffer to the modulator. The acoustooptic modulator controls the amount of light. Light modulation can be accomplished at high frequencies of 6 MHz or more. One common technique used to provide clock signals is a grating clock. In this technique, a second unmodulated laser beam is also reflected off the rotating mirror surface and scans a grating that intensity modulates the second light beam. A mirror projects the intensity modulated second light beam onto the surface of a detector which provides the synchronization clock signals as the line scan progresses. This system offers a number of advantages in that the clock signals produced are representative of the instantaneous beam position. U.S. Pat. No. 3,835,249 to Dattilo et al, issued Sept. 10, 1974, discloses such a system. One problem with grating clock arrangements is that they require other optical elements such as a grating element that must be accurately aligned to produce the desired clock signals.

In another approach, start-of-scan (SOS) and end-of-scan (EOS) detectors are located near the image plane and produce signals when illuminated by the scanning light beam. Clock signals must be generated which are started in phase with the start-of-scan (SOS) signal.

One method which has been used at moderate clock rates (i.e. 5 MHz) is to connect a crystal oscillator signal which produces signals at eight times (40 MHz) the desired clock signal frequency to a divide-by-eight counter. The counter is held clear until the SOS pulse occurs. The first clock pulse signal occurs one-half clock period later. However, variations in the start of the first clock pulse can cause as much as one eighth of a pixel variation in corresponding pixels from line to line. The EOS signal is used to clear the counter. At high clock rates, this method becomes difficult to implement. For example, a 12 MHz clock signal would require a counter which is fast enough to accept a 96 MHz crystal clock signal.

SUMMARY OF THE INVENTION

The object of this invention is to make use of the SOS and EOS signals provided by detectors to produce high frequency clock signals.

This object is achieved by an apparatus which uses an oscillator which includes a delay line that, in response to SOS and EOS signals, provides highly accurate clock signals.

A feature of this invention is that accurate clock signals at high frequency can be produced without the need for additional complex (laser, grating) optical elements. The same signals SOS and EOS that are used to produce the clock signal can also be used to servo the polygon motor to provide a constant line scan velocity.

BRIEF DESCRIPTION OF THE DRAWING

The drawing shows a simplified top plan view depicting an output polygon scanner and an apparatus for producing synchronization clock signals.

DESCRIPTION OF THE PREFERRED EMBODIMENTS

As shown in the drawing, a laser light beam 10 from laser 43 which is modulated by an acousto-optical modulator 14 and shaped by lens 44, is reflected off a mirrored facet of a rotating polygon 15 through optical element 25 and line scanned onto a photosensitive member M located at an image zone. The polygon is continuously driven by a motor 16 controlled by a servo-controller 17. The photosensitive member M is moved in a direction perpendicular to the line scan by means not shown to provide a two-dimensional image. Clock signals are needed to control the flow of data to the modulator 14 in accordance with the position of the beam 10 in the line scan.

A pair of spaced detectors 26 and 28, such as conventional photodiodes, are located adjacent to the image zone and when illuminated by the line scan beam respectively produce conventional start-of-scan (SOS) and end-of-scan (EOS) pulse signals. Amplifiers 26a and 28a respectively amplify these signals and provide them to an oscillator 22 which produces the clock signals. The oscillator 22 includes a flip-flop 27, a Nor gate 28 and a delay line 29.

The flip-flop 27 has S and C inputs and "1" and "0" outputs. The "1" and "03[ designate the outputs and not signal levels. A pulse from the start of line detector will "Set" the flip-flop, that is, drives the 1-output to a high level and the 0-output to a low level. A pulse from the end of line detector will "clear" (Reset) the flip-flop, that is, drives 0-output to a high level and the 1-output to a low level.

At the start of a line scan (which we will designate as time $t_o$) the SOS signal sets flip-flop 27, and the "0" output provides a low level input to the Nor gate 28. The other input to Nor gate 28 is from the output of delay line 29. Since it is also low at time $t_o$, the output of Nor gate 28 is driven high. The output of Nor gate 28 is propagated through the delay line. The delay line 29 has a selected delay of $\tau/2$. At time $(t_o+\tau/2)$, the output of the delay line is driven high. The output of the Nor gate is now driven low. The output of the delay line is the clock signal. The clock signal has a period equal to twice the delay time $\tau/2$ of the delay line. A resistor 30 is provided at the output of the delay line and has a resistance selected to provide proper termination which reduces reflection and noise. An inverting amplifier 32 which provides a buffering function inverts and adjusts the clock signal level. The construction of a delay line oscillators are well known in the art. For further reference, examples of oscillators which use delay lines are set forth in U.S. Pat. Nos. 3,993,957; 4,134,073 and 4,316,148.

The SOS and EOS signals are also provided to the servo controller 17. The controller 17, as will be understood by those skilled in the art can be quite conventional, measures the time of flight between detectors 26 and 28 and provides a control signal to adjust the motor 16 so that the angular velocity of the polygon 15 is maintained constant.

The oscillator 22 produces relatively noiseless clock signals and inputs them to the inverting amplifier 32. The falling edges of the clock signals from the amplifier 32 gates data from the storage buffer 34 to a power amplifier 38. It will be understood that the storage buffer 34 includes a conventional digital-to-analog converter (not shown). The storage buffer receives digital data representative of the information to be recorded on the member M from an information source not shown. The amplifier 38 provides driving analog signals to the acoustooptical modulator 14 in the usual manner. The acoustooptical modulator creates a diffraction grating that causes a first-order beam to be diffracted out of the original beam. Beam 10 is information-wise modulated in accordance with the data delivered from the buffer 34.

An oscillator was constructed using a delay line and NOR gate from Engineered Components Co. (Model TTLSWGM-12) and a 12 MHz clock signal was produced which gated data to a modulator of a polygon laser scanner. The start-of-scan (SOS) signal was used to enable the oscillator, and the first clock pulse occured after one half of a clock pulse period (41.7 nsec). The variation in time difference of the first clock pulse signal from a desired start time was measured at less than 1.0 nsec. This caused less than one eightieth of a pixel variation in corresponding pixels at the image zone from line to line.

The invention has been described in detail with particular reference to an output scanner, but it will be understood that it can also be employed in input scanners which line scan a laser light beam.

I claim:

1. In apparatus for producing output signals which have a precise period, these signals control the timing of information-wise modulation of a laser light beam scanned across a photosensitive surface by rotating polygon, such apparatus including a first detector which is located in the scanned beam path and produces a start-of-scan (SOS) signal, and a second detector which is located in the scanned beam path and produces an end-of-scan (EOS) signal; the improvement comprising a $\tau/2$ delay line which produces the output signals; a nor gate coupled to the delay line and connected to receive the output signals; and a flip-flop controlled by the (SOS) and (EOS) signals and providing an input signal to the nor gate such that the output signals produced by the delay line have a precise period $\tau$.

* * * * *